(12) United States Patent
Smetana

(10) Patent No.: US 7,624,645 B2
(45) Date of Patent: Dec. 1, 2009

(54) COMPENSATION APPARATUS

(75) Inventor: Tomas Smetana, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 112 days.

(21) Appl. No.: 12/105,404

(22) Filed: Apr. 18, 2008

(65) Prior Publication Data
US 2008/0257056 A1 Oct. 23, 2008

(30) Foreign Application Priority Data
Apr. 21, 2007 (DE) .................. 10 2007 018 928

(51) Int. Cl.
*G01B 7/16* (2006.01)
(52) U.S. Cl. ......................... 73/766; 73/760
(58) Field of Classification Search ............ 73/760–860
See application file for complete search history.

(56) References Cited

U.S. PATENT DOCUMENTS

| | | | | |
|---|---|---|---|---|
| 5,356,446 A | * | 10/1994 | Smetana et al. | 52/742.1 |
| 5,719,444 A | * | 2/1998 | Tilton et al. | 257/714 |
| 6,176,931 B1 | * | 1/2001 | Restaino et al. | 118/715 |
| 6,238,532 B1 | * | 5/2001 | Rossnagel et al. | 204/298.06 |
| 6,316,752 B1 | * | 11/2001 | Smetana et al. | 219/543 |
| 2008/0028782 A1 | * | 2/2008 | Tilton et al. | 62/259.2 |

* cited by examiner

*Primary Examiner*—Max Noori
(74) *Attorney, Agent, or Firm*—Lucas & Mercanti, LLP

(57) ABSTRACT

The invention relates to a compensation apparatus for compensating for thermally induced relative axial positional changes between two components, having a first compensation part which brings about an axial temperature-compensating movement of one of the compensation parts via a conical sliding face in a corresponding recess of a second compensation part if the radial extent of at least one of the compensation parts changes in a temperature-induced manner. In order to optimize the compensation capability of this apparatus, and to make it as far as possible independent of production tolerances of its installation surroundings with particularly simple means, there is provision for at least one compensation part to have a joint with a joint width which is variable during operation and imparts mechanical radial spring properties to the compensation part.

4 Claims, 5 Drawing Sheets

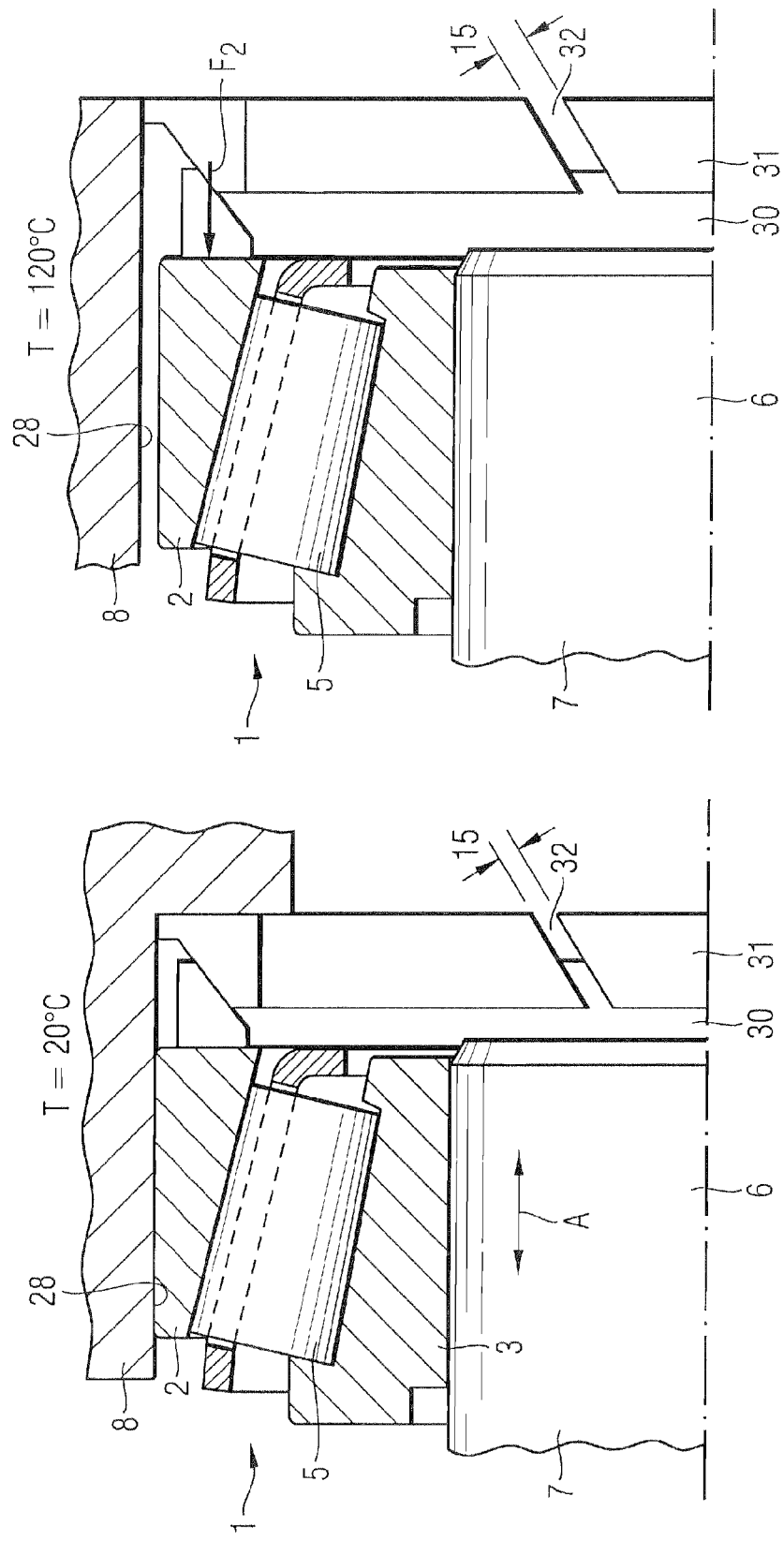

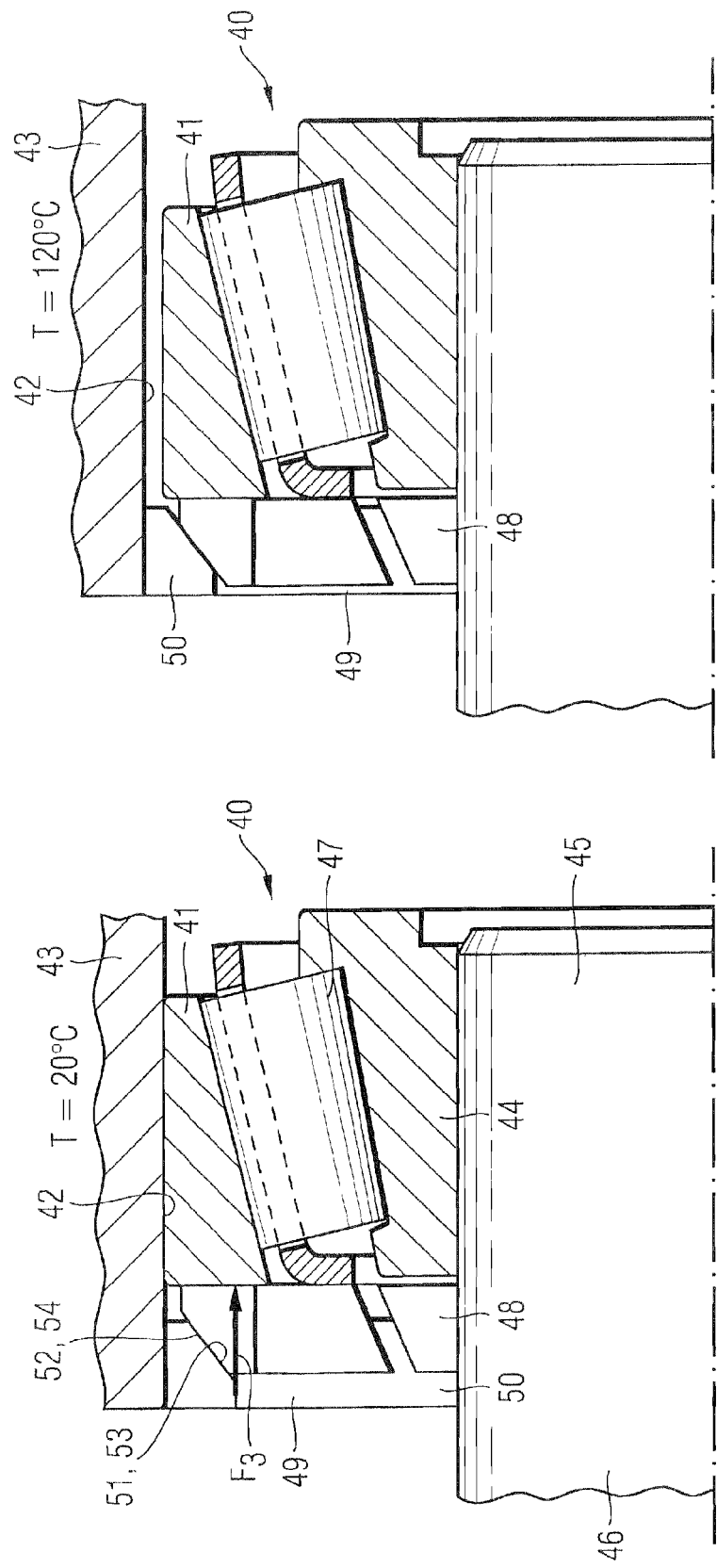

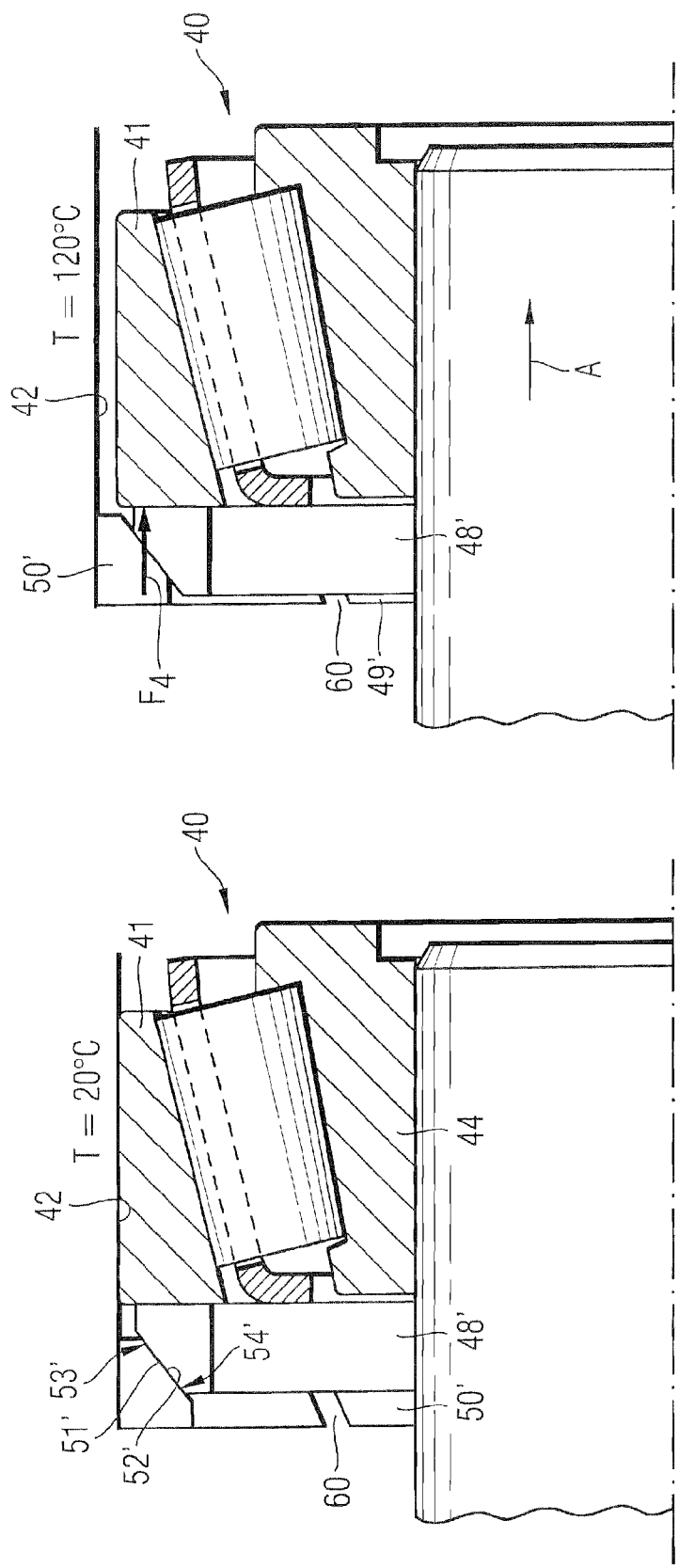

COMPENSATION APPARATUS

FIELD OF THE INVENTION

The invention relates to a compensation apparatus for compensating for thermally induced relative axial positional changes between two components, having a first compensation part which brings about an axial temperature-compensating movement of one of the compensation parts via a conical sliding face in a corresponding recess of a second compensation part if the radial extent of at least one of the compensation parts changes in a temperature-induced manner.

The compensation of temperature-induced, different thermal expansions of machine parts is of significance particularly in tapered roller bearing arrangements in differentials or change-speed transmissions, in particular of motor vehicles. In order to save weight in transmission engineering, components which are loaded to a relatively small extent mechanically, such as the transmission housing, are produced nowadays from lightweight metals, such as aluminum. In contrast, mechanically loaded transmission components, such as the drive and output shafts, are usually produced from steel. Steel and aluminum have a coefficient of thermal expansion which is different by approximately the factor two, with the consequence that these machine parts experience different relative positional changes in the case of rising or falling temperatures. As a result, the set prestress of the bearings, in particular tapered roller bearings, decreases as the temperature rises. In the case of a bearing spacing of 200 mm, a bearing play of approximately 0.25 mm is produced in the event of a temperature increase by 100° C., depending on the bearing construction. This bearing play has the consequence of considerable undesirable secondary effects, for example an axial shaft eccentricity, and no longer ideal tooth engagement of the transmission gearwheels with a resulting development of noise and, in manual transmissions, an unfavorable shifting sensation.

Against this background, it is known, for example, from U.S. Pat. No. 5,028,152 and WO 2006/014934 A1 to provide compensation elements made from elastomers in the form of plastic rings which exhibit approximately ten to fifteen times the thermal expansion in comparison with steel, in order to compensate for thermally induced relative axial positional changes between two components.

DE 42 21 802 A1 discloses a serial arrangement of a plurality of compensation rings of this type in order to increase the compensation effect. However, temperature-compensating apparatuses which are based on this material have the disadvantage that the bearing prestress and the operating loading have to be transmitted via this material (elastomer) which has substantially lower strength characteristic values than steel and, moreover, tends to shrink and to relax. Therefore, only comparatively low axial compensation forces can be generated or transmitted by way of these known apparatuses. In addition, the temperature-compensating capabilities of these known apparatuses are not stable in the long term.

German laid-open specification DE 41 18 933 A1 has disclosed an apparatus of the generic type which comprises at least two components, of which the first is inserted with a conical sliding face into a corresponding hole of the second component. The first component has a higher coefficient of thermal expansion than the second component. As the temperature increases and in the case of the radial expansion of the first component which is induced thereby, the cooperating conical sliding faces of the two components produce an axial movement of the two components with respect to one another, as a result of which different thermal expansions on machine parts can be compensated for. Here, only relatively small compensation paths can be realized, however.

The first component can be adjusted via a mechanical adjusting device in its diameter in such a way that the apparatus produces a bearing prestress. The adjusting device has to be set carefully (once) during assembly and is problematical with regard to long-term stability (for example, on account of the settling behavior of the actuators which are used).

Against this background, the object of the present invention comprises optimizing the compensation capability of an apparatus of the type which is mentioned in the introduction and making it as far as possible independent of production tolerances of its installation surroundings with particularly simple means.

According to the invention, this object is achieved by an apparatus having the features of Patent Claim 1.

Accordingly, in the apparatus according to the invention, at least one compensation part has a joint with a joint width which is variable during operation and imparts mechanical radial spring properties to the compensation part.

In the context of the present invention, joint is understood in general as an intentional material division in the compensation part and such an embodiment of the division region which imparts to the latter a radial spring capability which goes beyond the inherent material expansion capability in the radial direction, by virtue of the fact that the compensation part is additionally resilient mechanically in a spring-elastic manner or can be compressed.

As a result, in a deviation from the principle which is known from DE 41 18 933 A1, considerably increased radial spring properties which have a positive effect are also imparted to the compensation part during operation. The spring properties result from the elastic material deformation of the compensation part, which material deformation is produced only by the material division and the possibility that the width of the joint varies during operation. Only as a result of this can the separation points of the compensation part move away from one another or toward one another as required, with an increase or decrease in the prestressing forces.

As a result, dimensional deviations of corresponding and functionally cooperating components, such as the other compensation part or, for example, housing-side receiving openings, can be compensated for in a wide range, without a complicated adjusting apparatus according to DE 41 18 933 A1 being required. As a result, a reliable active contact of the two sliding faces on one another, which is very highly stable in broad temperature ranges, is ensured at all times.

According to one advantageous refinement of the invention, there is provision for one compensation part to be held in a receptacle under resilient prestress. This has the advantage that the resilient compensation part is inserted under compressive prestress, for example into a corresponding hole of a bearing housing, which is preferred with respect to the material loading with regard to the service life.

It is preferred with regard to the manufacturing costs and in terms of production technology if both compensation parts are composed of steel.

One possibility of imparting the mechanically resilient property to the compensation part which is particularly preferred in times of production technology comprises one compensation part having an axial slot.

Further advantages and aspects of the invention result in addition or in a supplementary manner from the following description of the invention with reference to the drawing, in which:

FIG. 3 shows a longitudinal section through a second exemplary embodiment at room temperature and elevated temperature;

FIG. 4 shows a longitudinal section through a third exemplary embodiment at room temperature and elevated temperature; and FIG. 5 shows a longitudinal section through a fourth exemplary embodiment at room temperature and elevated temperature.

In principle, the invention is also suitable for different bearing types and bearing categories (floating/locating bearings or locating/locating bearings (for example, spindle bearings)). One preferred application of the invention are differential transmissions, engine transmissions or distributor transmissions, for example for motor vehicles, in which a housing made from die cast aluminum is usually provided and the output shafts and drive shafts are produced from steel and are mounted in an X-arrangement by means of tapered roller bearings. Here, one particular aspect of the invention is that customary bearings can be used and the temperature compensation takes place by way of the separate temperature-compensating apparatus according to the invention.

Figure 1:
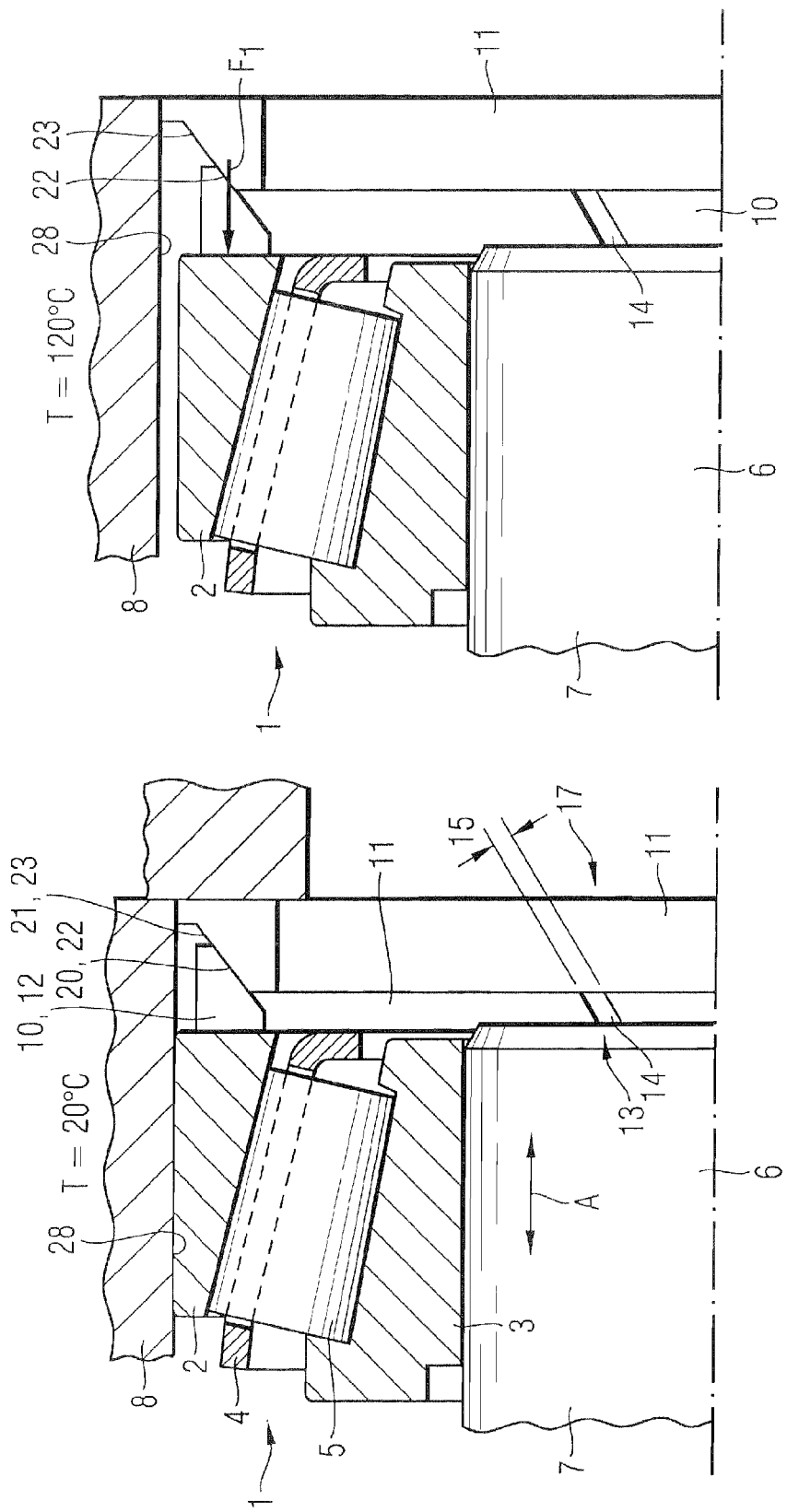
FIG. 1 shows a longitudinal section through a first exemplary embodiment of the invention at room temperature and elevated temperature.

FIG. 1 shows a tapered roller bearing 1 in what is known as an x-arrangement having an outer bearing ring 2 and an inner bearing ring 3, between which tapered rollers 5 which are held in a bearing cage 4 are situated. The tapered roller bearing 1 mounts the end 6 of a shaft 7 in an aluminum housing 8.

The temperature-compensating apparatus comprises two compensation parts 10, 11 which are configured as rings or disks in the exemplary embodiment. The compensation part 10 is configured as a steel disk and forms an outer part 12. The compensation part 10 has a joint 13. The latter is realized here as an axial slot 14. The joint 13 and the slot 14 have a width 15 which is variable during operation.

In the context of the present invention, the term "axial slot" denotes an opening which penetrates the material of the compensation part in the axial orientation, with the result that the compensation part can spring open radially in a mechanical manner with an increase in the slot width or can be compressed radially in a resilient manner with a reduction in the slot width. Here, the slot 14 does not necessarily have to extend in the axial direction A, but, as shown, can extend obliquely with respect thereto or in a stepped manner.

The second compensation part 11 which is configured as an aluminum disk in this exemplary embodiment and protrudes into the opening or conical hole 16 of the first compensation part 10 is connected to the aluminum housing 8. It is therefore also denoted as inner part 17.

Figure 2:
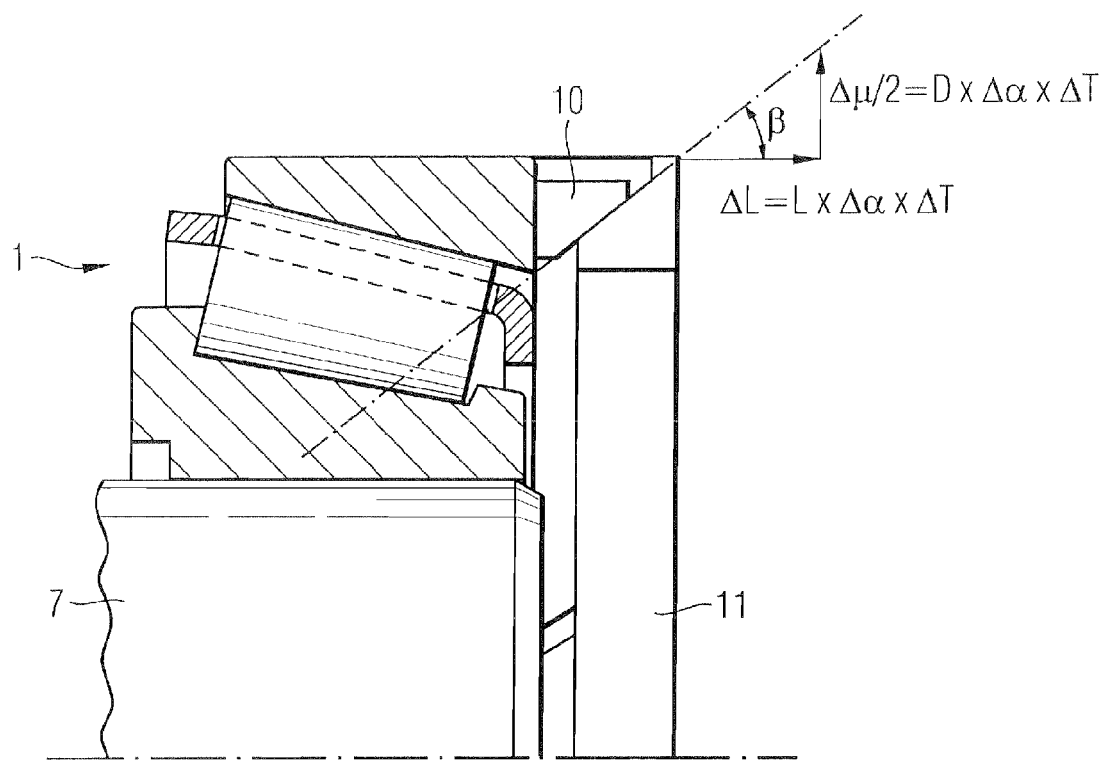
FIG. 2 shows construction variables which are relevant for the design of the conical sliding faces.

The compensation parts 10, 11 have cooperating active faces in the form of conical faces 20, 21 which are configured with identical cone angles (cf. also FIG. 2 in this regard). They act as sliding faces 22, 23 which bring about a movement of the compensation part 10 (outer part 12) in the axial direction A according to their cone angle in the case of the radial expansion or contraction of the second compensation part 11 (inner part 17). Here, a pressing force between the sliding faces 22 and 23 is always ensured in the radial direction as a result of the resilient configuration of the compensation part 10. As a result, the apparatus is extremely insensitive both with regard to any production tolerances, for example, in the external dimensions of the sliding face 23 or the internal dimension of the sliding face 22 and also with regard to any temperature-induced radial dimensional changes of the affected components.

In order to explain the thermal conditions, the left-hand side of FIG. 1 shows the situation at room temperature (T=20° C.), that is to say at the customary assembly temperature. In order also to ensure the bearing prestress which is set in this state independently of temperature changes which occur during operation, the apparatus compensates for any relative positional changes between the shaft 7 and the aluminum housing 8, as can be seen on the right-hand side of FIG. 1. For this purpose, the thermally induced expansion of the housing 8 at an increased temperature (T=120° C.) is shown by way of example and in a very exaggerated manner, while the shaft 7 has almost unchanged dimensions.

As a result of the temperature expansion of the housing 8, the receiving hole 28, into which the outer ring 2 is inserted, has also been widened radially. In order, nevertheless, to ensure a reliable rolling movement of the tapered rollers 5 on the running face of the outer ring 2, the axial prestress of the outer ring 2 has to be maintained, for which purpose an axial force $F_1$ is required. This continues to be provided reliably despite the length expansion of the housing 8 which is likewise shown in exaggerated form on the right in FIG. 1, by the fact that the resiliently positioned ring (compensation part 10) is pushed to the left in the axial direction on account of the radial expansion of the compensation part 11 and brings about the sufficient axial force component ($F_1$) via the conical, cooperating sliding faces 22, 23 on account of the radial expansion of the compensation part 11. In the case of the above-described geometry change of the affected components, smooth sliding of the sliding faces 22, 23 is always ensured on account of the resilient property of the compensation part 10.

FIG. 2 shows the apparatus which is shown on the left-hand side in FIG. 1, the dimensions being shown which are relevant for the design of the respective cone of the compensation parts 10, 11. Here, the angle β which defines the prestressing force results from the ratio of the radial and axial thermal expansion. Here, this angle has to lie above what is known as the self-locking angle. The self-locking angle results from the coefficient of friction between the compensation parts 10, 11 according to the following formula:

$$\tan\beta = \frac{D/2 \cdot \Delta\alpha \cdot \Delta T}{L \cdot \Delta\alpha \cdot \Delta T} = \frac{D}{2 \cdot L} > \mu$$

β=half the cone angle

D=diameter of the housing hole

L=bearing spacing

ΔT=difference between operating temperature and room temperature

Δα=difference between the thermal expansions of the steel shaft and of the aluminum housing μ=coefficient of friction between the sliding faces 22, 23.

It can also be seen from this that the apparatus according to the invention utilizes thermally induced dimensional changes of the compensation part 11 both in the radial and in the axial direction and therefore optimizes the degree of efficiency.

FIG. 3 shows an application of the invention in a tapered roller bearing in an X-arrangement. In this exemplary embodiment, the tapered roller bearing 1 is received with its outer ring 2 in a receiving hole 28 of an aluminum housing 8, as described in detail in conjunction with FIG. 1. The inner ring 3 is attached to the end 6 of a shaft 7. In this exemplary embodiment, however, both compensation parts 30, 31 are composed of steel, as a result of which they can be produced simply and inexpensively.

The inner compensation part 31 (inner part) which is supported against the housing 8 is provided with a joint in the form of an axially extending slot 32. The slot does not have to extend rectilinearly in the axial direction A in this case as well, but can have substantially any desired shape and orientation as long as it permits radial compression of the compensation part 31. The compensation part 31 is pressed together or compressed radially with a reduction in the slot 32 and is therefore inserted into the hole 28 with an accurate fit. This has the effect which is advantageous for the material service life that the compensation part 31 is mechanically prestressed in a resilient manner under pressure.

As the right-hand side of FIG. 3 makes clear, the housing 8 has expanded both axially and radially with respect to the shaft arrangement at an increased operating temperature of T=120° C. on account of the different coefficients of thermal expansion of the bearing or shaft material (steel) with respect to the material of the housing 8 (aluminum). The outer ring 2 is therefore held freely in the radial direction in this operating situation and, as has already been explained, an additional axial prestressing force $F_2$ which is maintained in all operating situations is required on the outer ring in order to ensure slip-free and low-wear running of the tapered rollers 5.

On account of the resilient property of the compensating part 31 and the radially outwardly directed, mechanical prestress which is produced as a result, the compensation part follows the widening of the receiving hole 28 in the radial direction, the slot 32 widening Here, the prestress or radial mechanical compression of the compensation part 31 in the installation state (T=20° C.) is dimensioned in such a way that there is always still a reliable prestress which fixes the compensation part 31 in the hole 28 even in the case of considerable heating and therefore expansion of the housing 8. This refinement has the additional advantage that dimensional deviations of the diameter of the hole 28 can be compensated for within wide ranges.

The compensation part 30 is displaced to the left in the direction of the force $F_2$ on account of the radial expansion of the compensation part 31. As a result, the required prestressing force $F_2$ continues to be exerted on the bearing outer ring 2.

FIG. 4 shows an apparatus according to the invention in an O-arrangement of a tapered roller bearing 40. Here too, the outer ring 41 is received in a receiving hole 42 of an aluminum housing 43. The inner ring 44 is attached to the end 45 of a steel shaft 46. The tapered rollers 47 are situated between the inner ring 44 and the outer ring 41. In this exemplary embodiment, a compensation part 48 is provided as inner part in the form of a slotted steel disk which penetrates the conical hole 49 of a second compensation part 50. As described in the preceding text, the conical faces 51, 52 form sliding faces 53, 54, along which the compensation parts 48, 50 slide depending on the thermal length change, with maintenance of an axial prestressing force $F_3$ which acts on the outer ring 41.

The right-hand side of FIG. 4 shows the situation at elevated temperature (T=120° C.). The outer ring 41 is held freely in a radial manner on account of the radial expansion of the housing 43, a relative movement of the compensation part 48 further into the conical hole 49 of the compensation part 50 having taken place by the sliding faces 53 and 54 sliding along. The sliding faces 53 and 54 are in reliable contact and ensure the temperature-compensated prestress of the outer ring 41 as a result of the radial prestress which is produced on account of the mechanical spring properties of the slotted compensation part 48. The compensation part 48 is preferably connected fixedly to the bearing outer ring 41. The outer part (compensation part 50) can also be configured as an aluminum disk and can therefore have corresponding thermal expansion properties like the aluminum housing 43.

The exemplary embodiment which is shown in FIG. 5 corresponds largely to the arrangement which is shown in FIG. 4. However, in this exemplary embodiment, the compensation part 48' is configured as a non-slotted steel disk (inner part), while the further compensation part 50' is configured as a steel disk having a slot 60. As has been described above, conical circumferential faces 51', 52' are provided as sliding faces 53'and 54'.

At elevated temperature (T=120° C.), as shown on the right-hand side of FIG. 5, the receiving hole 42 is widened radially and the compensation part 48' has penetrated further into the axial hole 49' of the compensation part 50' in the axial direction A. This results in an adaptation of the prestressing force $F_4$ which acts on the outer ring 41.

As FIG. 5 shows, furthermore, the compensation part 50' is inserted into the hole 42 under prestress which, in the heated operating state, leads to a radial expansion of the compensation part 50' with corresponding widening of the slot 60.

The present invention can realize a minimization of the prestressing force losses in the bearing as a consequence of temperature changes with simple means Here, the apparatus according to the invention is distinguished by particularly simple assembly and requires only inexpensive components which can be produced simply. Here, the apparatus is very extremely tolerant to dimensional deviations or inaccuracies in the geometry of cooperating components. The apparatus realizes as far as possible a freedom from play of the shaft with high bearing rigidity, which leads to optimization of the tooth engagement in transmissions and therefore overall to an increase in the respective component service life, in particular the gearwheel service life in transmissions. In change-speed transmissions, the apparatus according to the invention additionally brings about an improved shifting sensation and a considerable noise reduction.

| List of Designations | |
|---|---|
| 1 | Tapered roller bearing |
| 2 | Outer bearing ring |
| 3 | Inner bearing ring |
| 4 | Bearing cage |
| 5 | Tapered rollers |
| 6 | End of the shaft 7 |
| 7 | Shaft |
| 8 | Aluminum housing |
| 10 | Compensation part |
| 11 | Compensation part |
| 12 | Outer part |
| 13 | Joint |
| 14 | Axial slot |
| 16 | Hole |
| 17 | Inner part |
| 20, 21 | Conical faces |
| 22, 23 | Sliding faces |
| 28 | Receiving hole |
| 30 | Compensation part |
| 31 | Compensation part |
| 32 | Slot |
| 40 | Tapered roller bearing |
| 41 | Outer ring |
| 42 | Receiving hole |
| 43 | Aluminum housing |
| 44 | Inner ring |
| 45 | End |
| 46 | Steel shaft |

-continued

List of Designations

| | |
|---|---|
| 47 | Tapered rollers |
| 48 | Cage |
| 48, 48' | Compensation part |
| 49, 49' | Conical hole |
| 50, 50' | Compensation part |
| 51, 51' | Conical face |
| 52, 52' | Conical face |
| 53, 53' | Sliding face |
| 54, 54' | Sliding face |
| 60 | Slot |
| A | Axial direction |
| $F_1$ | Axial force |
| $F_2, F_3, F_4$ | Axial prestressing force |

The invention claimed is:

1. A compensation apparatus for compensating for thermally induced relative axial positional changes between two components, comprising: a first compensation part and a second compensation part wherein an axial temperature-compensating movement of one of the compensation parts via a conical sliding face in a corresponding recess of the second compensation part if the radial extent of at least one of the compensation parts changes in a temperature-induced manner, wherein at least one compensation part has a joint with a joint width which is variable during operation and imparts mechanical radial spring properties to the compensation part.

2. The apparatus of claim 1, wherein the compensation part is a resilient configuration and is held in a receptacle under resilient prestress.

3. The apparatus of claim 1 wherein both compensation parts are composed of steel.

4. The apparatus of claim 1, wherein one of the compensation parts has an axial slot.

* * * * *